United States Patent
Huang

(10) Patent No.: US 11,531,733 B2
(45) Date of Patent: Dec. 20, 2022

(54) AUTHORITY FILTER METHOD AND AUTHORITY FILTER DEVICE

(71) Applicants: FUZHOU BOE OPTOELECTRONICS TECHNOLOGY CO., LTD., Fuzhou (CN); BOE TECHNOLOGY GROUP CO., LTD., Beijing (CN)

(72) Inventor: Chenxu Huang, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 92 days.

(21) Appl. No.: 15/734,314

(22) PCT Filed: Feb. 28, 2020

(86) PCT No.: PCT/CN2020/077158
§ 371 (c)(1),
(2) Date: Dec. 2, 2020

(87) PCT Pub. No.: WO2020/187001
PCT Pub. Date: Sep. 24, 2020

(65) Prior Publication Data
US 2021/0224364 A1 Jul. 22, 2021

(30) Foreign Application Priority Data
Mar. 18, 2019 (CN) .......................... 201910203835.X

(51) Int. Cl.
*G06F 21/31* (2013.01)

(52) U.S. Cl.
CPC .................................. *G06F 21/31* (2013.01)

(58) Field of Classification Search
CPC ...................................................... G06F 21/31
See application file for complete search history.

(56) References Cited

U.S. PATENT DOCUMENTS

| | | | |
|---|---|---|---|
| 6,434,607 B1 * | 8/2002 | Haverstock | G06F 16/972 |
| | | | 707/E17.112 |
| 7,523,486 B1 * | 4/2009 | Turner | G06F 21/604 |
| | | | 726/16 |

(Continued)

FOREIGN PATENT DOCUMENTS

| | | |
|---|---|---|
| CN | 102053969 A | 5/2011 |
| CN | 104267944 A | 1/2015 |

(Continued)

OTHER PUBLICATIONS

First Chinese Office Action from Chinese Patent Application No. 201910203835.X dated May 27, 2020.

*Primary Examiner* — James R Turchen
(74) *Attorney, Agent, or Firm* — Dilworth & Barrese, LLP.; Michael J. Musella, Esq.

(57) ABSTRACT

The disclosure relates to an authority filter method which includes: determining an authority of a login user according to information of the login user; determining tags contained in a preset interface when the preset interface is accessed by the login user; executing a code corresponding to the tags to acquire the authority of the login user; determining a function of a target tag, among the tags, contained in the authority of the login user; and displaying a content corresponding to the target tag in the preset interface.

9 Claims, 7 Drawing Sheets

(56) References Cited

U.S. PATENT DOCUMENTS

| | | | | |
|---|---|---|---|---|
| 2001/0005848 A1* | 6/2001 | Haverstock | ............ | G06F 40/151 707/E17.112 |
| 2003/0200442 A1* | 10/2003 | Bhat | .................... | H04L 63/102 713/182 |
| 2004/0010710 A1* | 1/2004 | Hsu | ......................... | H04L 67/02 726/28 |
| 2007/0027897 A1* | 2/2007 | Bremer | ............... | G06F 16/3323 707/999.102 |
| 2009/0164447 A1* | 6/2009 | Daya | .................. | G06F 21/6218 707/999.005 |
| 2011/0145930 A1* | 6/2011 | Gnech | .................. | H04L 67/146 726/28 |
| 2012/0290920 A1* | 11/2012 | Crossley | ............. | G06F 11/3664 715/234 |
| 2013/0007891 A1* | 1/2013 | Mogaki | ............... | G06F 21/6218 726/27 |
| 2013/0086479 A1* | 4/2013 | Brown | .................. | G06F 16/972 715/741 |
| 2017/0147709 A1* | 5/2017 | Ganz | ................... | G06F 3/04845 |
| 2022/0067130 A1* | 3/2022 | Dabbs | ..................... | G06F 9/547 |

FOREIGN PATENT DOCUMENTS

| | | | |
|---|---|---|---|
| CN | 105843609 | A | 8/2016 |
| CN | 105867948 | A | 8/2016 |
| CN | 106227785 | A | 12/2016 |
| CN | 107846297 | A | 3/2018 |
| CN | 108965280 | A | 12/2018 |
| CN | 109214151 | A | 1/2019 |
| CN | 109409048 | A | 3/2019 |
| CN | 109918876 | A | 6/2019 |
| WO | 2019001322 | A1 | 3/2019 |

* cited by examiner

AUTHORITY FILTER METHOD AND AUTHORITY FILTER DEVICE

CROSS REFERENCE TO RELATED APPLICATION

The application claims priority to the Chinese patent application No. 201910203835.X, filed on Mar. 18, 2019, the entire disclosure of which is incorporated herein by reference as part of the present application.

TECHNICAL FIELD

The disclosure relates to the field of authority management, in particular to an authority filter method, an authority filter device, an electronic device and a computer readable storage medium.

BACKGROUND

Based on the system framework in related technology, when a user needs to perform an operation that requires an authority in an interface, the interface does not only show the content that the user has the authority to operate, but also show the content that the user have no authority to operate, so that the user needs to manually judge what content they have the authority to operate, resulting in a lower operation efficiency.

SUMMARY

An authority filter method, an authority filter device, an electronic device and a computer readable storage medium are provided in the present disclosure in order to solve the shortage of related technology.

According to the first aspect of at least one embodiment of the present disclosure, an authority filter method is provided, and the authority filter method comprises: determining an authority of a login user according to information of the login user; determining tags contained in a preset interface when the preset interface is accessed by the login user; executing a code corresponding to the tags to acquire the authority of the login user; determining a function of a target tag, among the tags, contained in the authority of the login user; and displaying a content corresponding to the target tag in the preset interface.

Optionally, before determining the tags contained in the preset interface, the method further comprises: configuring a custom tag library, and determining the tags contained in the preset interface comprises: determining a tag belonging to the custom tag library among the tags contained in the preset interface.

Optionally, the content corresponding to the target tag is displayed through a tree diagram, and displaying the content corresponding to the target tag in the preset interface comprises: displaying a corresponding branch of the content corresponding to the target tag in the tree diagram in the preset interface.

Optionally, before determining the authority of the login user according to information of a user table of the login user, the method further comprises: combining a SpringMvc framework and a Mybatis framework into a new system framework, based on Java interface-oriented programming technology and generic and reflection mechanisms; and the new system framework comprises the user table, a role table, an authority table, an intermediate table of a user role and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

Optionally, determining the authority of the login user according to the information of the login user comprises: determining a target user corresponding to the information of the login user in the user table; determining a target role associated with the target user in the intermediate table of the user role; and determining target authority associated with the target role in the intermediate table of the role authority.

According to the second aspect of at least one embodiment of the present disclosure, an authority filter device is provided, and the authority filter device comprises: an authority determination module configured to determine an authority of a login user according to information of the login user, a tag determination module configured to determine tags contained in a preset interface when the preset interface is accessed by the login user, an authority acquisition module configured to execute a code corresponding to the tags to acquire the authority of the login user, a function determination module configured to determine a function of a target tag, among the tags, contained in the authority of the login user, and a content display module, configured to display a content corresponding to the target tag in the preset interface.

Optionally, the device further comprises a tag configuration module configured to configure a custom tag library, and the tag determination module is configured to determine a tag belonging to the custom tag library among the tags contained in the preset interface.

Optionally, the content corresponding to the target tag is displayed through a tree diagram, and the content display module is configured to display a corresponding branch of the content corresponding to the target tag in the tree diagram in the preset interface.

Optionally, the device further comprises a framework combination module configured to combine a SpringMvc framework and a Mybatis framework into a new system framework based on Java interface-oriented programming technology and generic and reflection mechanisms, and the new system framework comprises a user table, a role table, an authority table, an intermediate table of a user role and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

Optionally, the authority determination module comprises a user determination sub-module configured to determine a target user corresponding to the information of the login user in the user table, a role determination sub-module configured to determine a target role associated with the target user in the intermediate table of the user role, and an authority determination sub-module configured to determine target authority associated with the target role in the intermediate table of the role authority.

According to the third aspect of at least one embodiment of the present disclosure, an electronic device is provided, the electronic device comprises a processor and a memory configured to store instructions that are capable of being executed by the processor, and the processor is configured to execute steps in the method according to any one of the embodiments of the present disclosure.

According to the fourth aspect of at least one embodiment of the present disclosure, a computer readable storage medium is provided, the computer readable storage medium stores a computer program, and when the computer program is executed by a processor, steps in the method according to any one of the embodiments of the present disclosure are achieved.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments are described in detail herein, examples of the embodiments are illustrated in the accompanying drawings. In the case where the following description refers to the drawings, unless otherwise indicated, the same numbers in different drawings refer to the same or similar elements. The embodiments described in the following exemplary embodiments do not represent all embodiments consistent with the present disclosure. Rather, they are merely examples of devices and methods consistent with some aspects of the disclosure as detailed in the appended claims.

Figure 1:
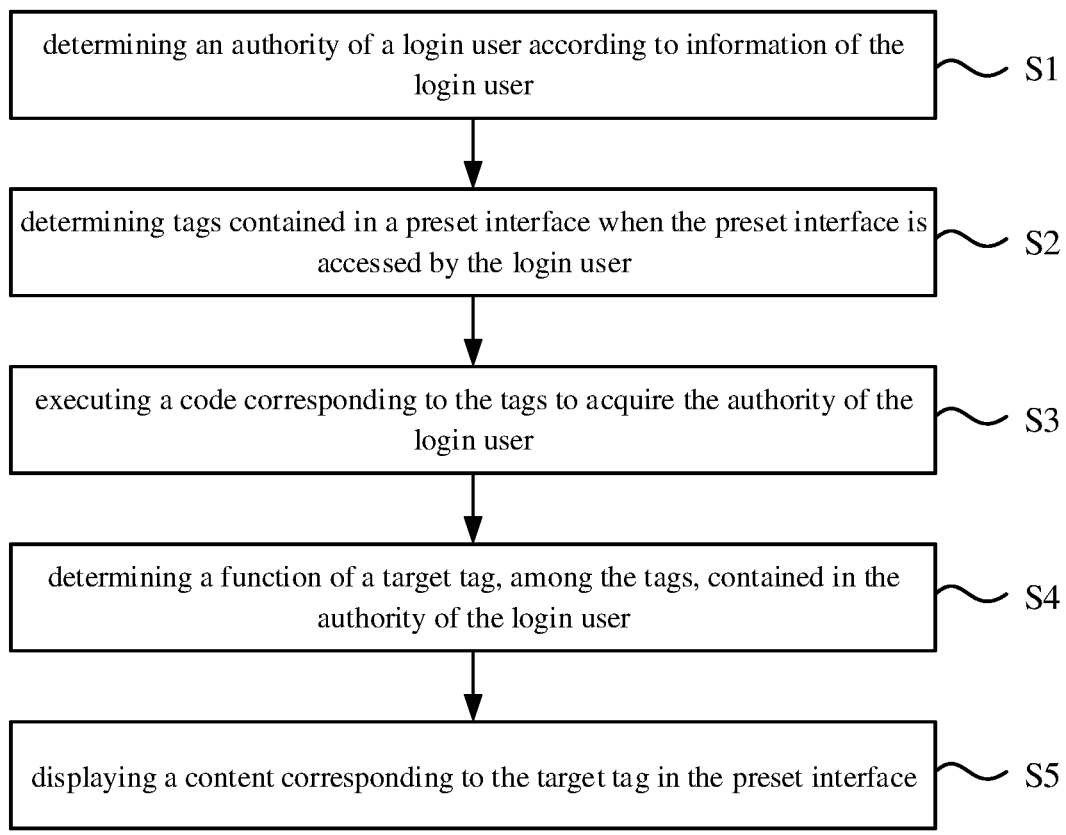
FIG. 1 is a schematic flow chart of an authority filter method according to an embodiment of the present disclosure.

FIG. 1 is a schematic flow chart of an authority filter method according to an embodiment of the present disclosure. The authority filter method in the embodiment of the present disclosure can be applied to terminals, such as mobile phones, tablet computers, wearable devices, etc., and can also be applied to servers. The embodiments of the present disclosure are exemplarily explained below mainly under the condition that the authority filter method applies to a server.

As illustrated in FIG. 1, the above authority filter method includes the following steps.

Step S1, determining an authority of a login user according to information of the login user;

Step S2, determining tags contained in a preset interface when the preset interface is accessed by the login user;

Step S3, executing a code corresponding to the tags to acquire the authority of the login user;

Step S4, determining a function of a target tag, among the tags, contained in the authority of the login user;

Step S5, displaying a content corresponding to the target tag in the preset interface.

In an embodiment, a user can log in by inputting a user name, a password, an IP address, etc. After the user logs in, the server can obtain the information of the login user, and determine authority of the user according to the information of the login user, and then save the determined authority and an identification of the authority in a session of the server, and save the information of the login user in the cookie for subsequent calling.

When the preset interface is accessed by the login user and before the preset interface displays content, the tags contained in the preset interface may be firstly determined, and then code corresponding to the tags are executed (the code can be executed in system descendants of the server) to acquire the authority of the login user saved in the session of the server.

It should be noted that the tag referred to in the embodiment of the present disclosure may specifically be a HyperText Markup Language (HTML) tag. The content corresponding to the tag may be a link of the tag, such as a URL.

The authority of the login user may include functions of one or more tags. After obtaining the authority of the login user, it can be judged whether the authority of the login user includes the function of the tag for each tag contained in the preset interface. If the authority of the login user includes the function of the tag, the tag can be used as a target tag, and the content corresponding to the target tag will be displayed in the preset interface, while other tags except the target tag will not be displayed in the preset interface.

Therefore, the contents corresponding to the target tags displayed in the interface are the contents corresponding to the tags that the user has the authority to use their functions, thus realizing the filtering of the authority of the user when displaying the interface. Compared with displaying the contents of all the tags contained in the interface, the user does not need to judge which tag he has the authority to use in the interface after the interface is displayed, which is convenient for the user to get started quickly and is beneficial to improving the operational efficiency.

Figure 2:
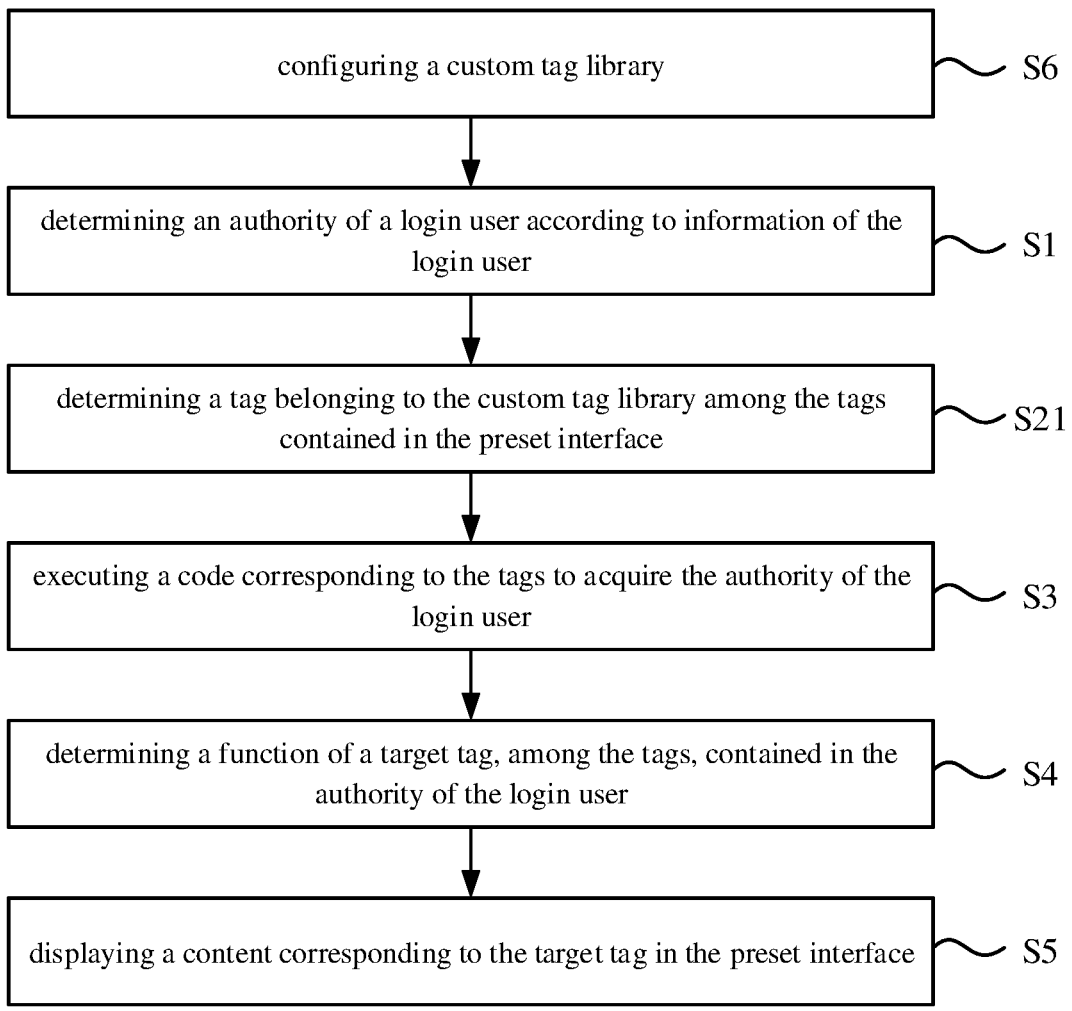
FIG. 2 is a schematic flow chart of another authority filter method according to an embodiment of the present disclosure.

FIG. 2 is a schematic flow chart of another authority filter method according to an embodiment of the present disclosure. As illustrated in FIG. 2, before determining the tags contained in the preset interface, the method further includes:

step S6, configuring a custom tag library.

Determining the tags contained in the preset interface includes step S21, determining a tag belonging to the custom tag library among the tags contained in the preset interface.

In one embodiment, the custom tag library can be pre-configured, and then when the preset interface is accessed by the login user, the tag belonging to the custom tag library among the tags contained in the preset interface is determined, and then in subsequent steps, operations can be performed on the tag belonging to the custom tag library, that is, code corresponding to the tag belonging to the custom tag library are executed to acquire the authority of the login user, then the function of the target tag, among the tags belonging to the custom tag library, contained in the authority of the login user is determined, and the content corresponding to the target tag are displayed in the preset interface.

Therefore, for the tags contained in the preset interface, the relationship between some tags and the authority of the login user can be selectively judged, so that the judging action is operable, and which tags are specifically judged is determined based on the custom tag library.

In one embodiment, configuring the custom tag library is realized by the following code:

```
<%@taglib prefix="boe" uri="/boe.com/java/tag"%>.
Configuring the following code in the interface:
<boe:check mark="orderInsert"></boe:check>.
For example, the code corresponding to this tag that is executed is as follows:
<tag>
<name>check</name>
<tag-class>com.boe.core.web.rightmanage.RightMarkCheckTag</tag-class>
    <body-content>JSP</body-content>
    <attribute>
        <name>mark</name>
        <required>true</required>
        <rtexprvalue>false</rtexprvalue>
    </attribute>
</tag>,
``` in which the boe is a prefix of the custom tag library, the check is the name of the tag, and the orderinsert is a identifier of the authority corresponding to the tag check, then executing the code corresponding to the tag can determine the tag belonging to the custom tag library with the boe as the prefix among the tags contained in the preset interface, and then judge whether the identifier corresponding to the authority of the login user contains the same identifier as the orderinsert. If the identifier corresponding to the authority of the login user contains the same identifier as the orderinsert, it can be determined that the authority of the user contains the function of the tag check.

Figure 3:
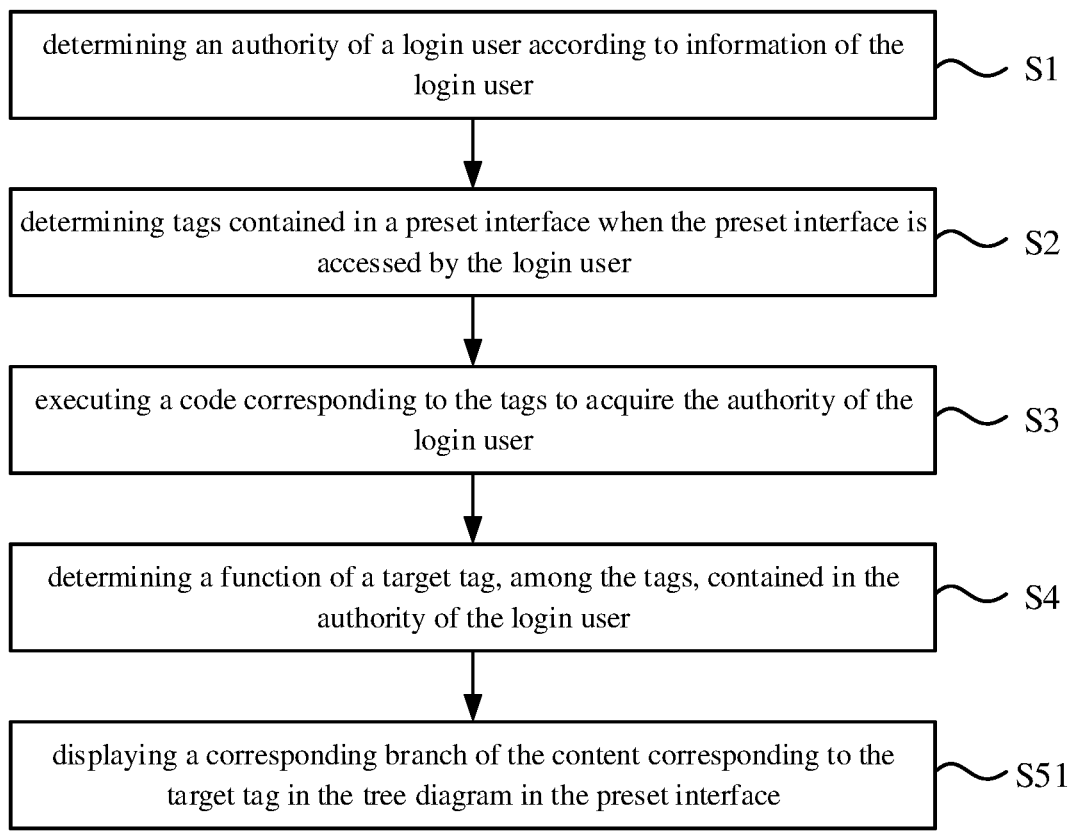
FIG. 3 is a schematic flow chart of further another authority filter method according to an embodiment of the present disclosure.

FIG. 3 is a schematic flow chart of further another authority filter method according to an embodiment of the present disclosure. As illustrated in FIG. 3, the content corresponding to the target tag is displayed through a tree diagram, and displaying the content corresponding to the target tag in the preset interface includes:

step S51: displaying a corresponding branch of the content corresponding to the target tag in the tree diagram in the preset interface.

In an embodiment, the content corresponding to a tag can be displayed through a tree diagram, for example, the tree diagram can display up to three branches, and the three branches respectively and successively correspond to the content corresponding to tag A, the content corresponding to tag B, and the content corresponding to tag C.

For example, the authority of user A includes the functions of the tag A and the tag B, therefore when the user A accesses the preset interface, according to the present embodiment, the tree diagram in the preset interface shows two branches, one of the two branches shows the content corresponding to the tag A and the other shows the content corresponding to the tag B.

User A can only see the content corresponding to the function he has the authority to use in the preset interface, that is, the contents corresponding to the tag A and the tag B, and user A can only operate the contents corresponding to the tag A and the tag B in the preset interface, so it is not necessary for user A to manually judge which content he has the authority to operate in the preset interface, which is beneficial to improving the operational efficiency of the user A.

For example, if the authority of the user B includes the function of the tag C, then when the user B accesses the preset interface, according to the present embodiment, the tree diagram in the preset interface shows one branch which shows the content corresponding to the tag C.

Therefore, the user B can only see the content corresponding to the function that he has the authority to use in the preset interface, that is, the content corresponding to the tag C, and the user B can only operate the content corresponding to the tag C in the preset interface without manually judging which content he has the authority to operate in the preset interface, which is beneficial to improving the operational efficiency of the user B.

In an embodiment, the preset interface can be designed based on a frameset, and the tree branches of the tree diagram and the names of the tags are displayed on the left side of the interface, the contents of the tags are displayed on the right side, the system logo can be displayed on the upper part of the interface, and copy authority comments can be displayed on the lower part of the interface. Of course, the layout of the contents in the preset interface can also be adjusted as required.

Figure 4:
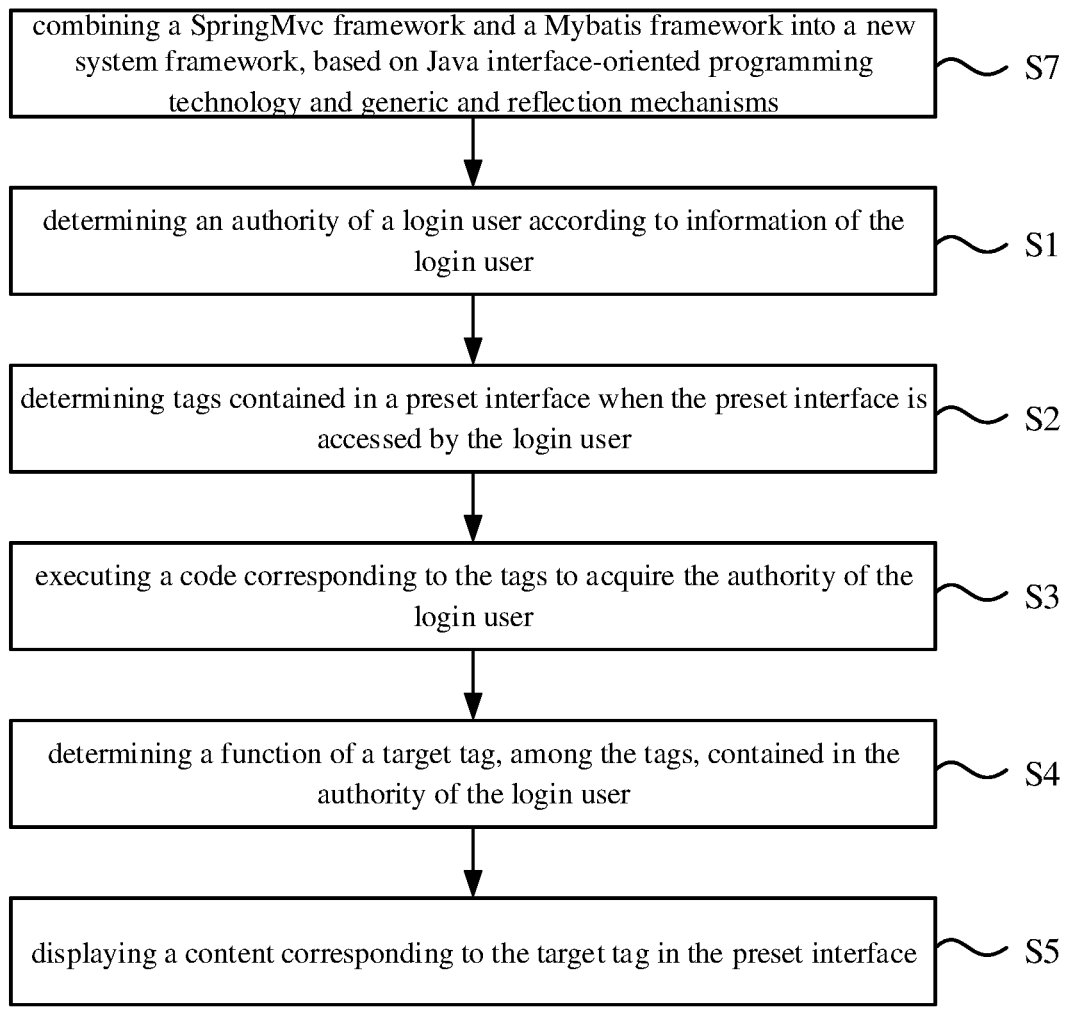
FIG. 4 is a schematic flow chart of further another authority filter method according to an embodiment of the present disclosure.

FIG. 4 is a schematic flow chart of further another authority filter method according to an embodiment of the present disclosure. As illustrated in FIG. 4, before determining the authority of the login user according to information of a user table of the login user, the method further includes:

step S7, combining a SpringMvc framework and a Mybatis framework into a new system framework, based on Java interface-oriented programming technology and generic and reflection mechanisms.

In the step S7, the new system framework includes the user table, a role table, an authority table, an intermediate table of a user role and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

In an embodiment, the SpringMvc framework and Mybatis framework can be combined into a new system framework based on Java interface-oriented programming technology and generic and reflection mechanisms. For example, the SpringMvc framework can be used as a main body, and then the new system framework can be built by combining the function of Mybatis persistence layer. By combining these two open source frameworks, users can operate in one framework (the new system framework in this embodiment) and use the functions of the two frameworks without having to separately operate in the two frameworks, which is convenient for users to call the functions in the two frameworks for combined use, which is conducive to improving the efficiency of development work.

Furthermore, the relationship among the user, the role and the authority is expressed and determined through the user table, the role table, the authority table, the intermediate table of the user role and the intermediate table of the role authority, which is convenient for determining the user authority.

It should be noted that the information of the user recorded in the user table can include information such as the user's login password, the user's gender, and the department to which the user belongs. The authority table can also record the identification of the superior authority of the authority, the link of the superior authority, whether the authority has menu items, and so on.

Figure 5:
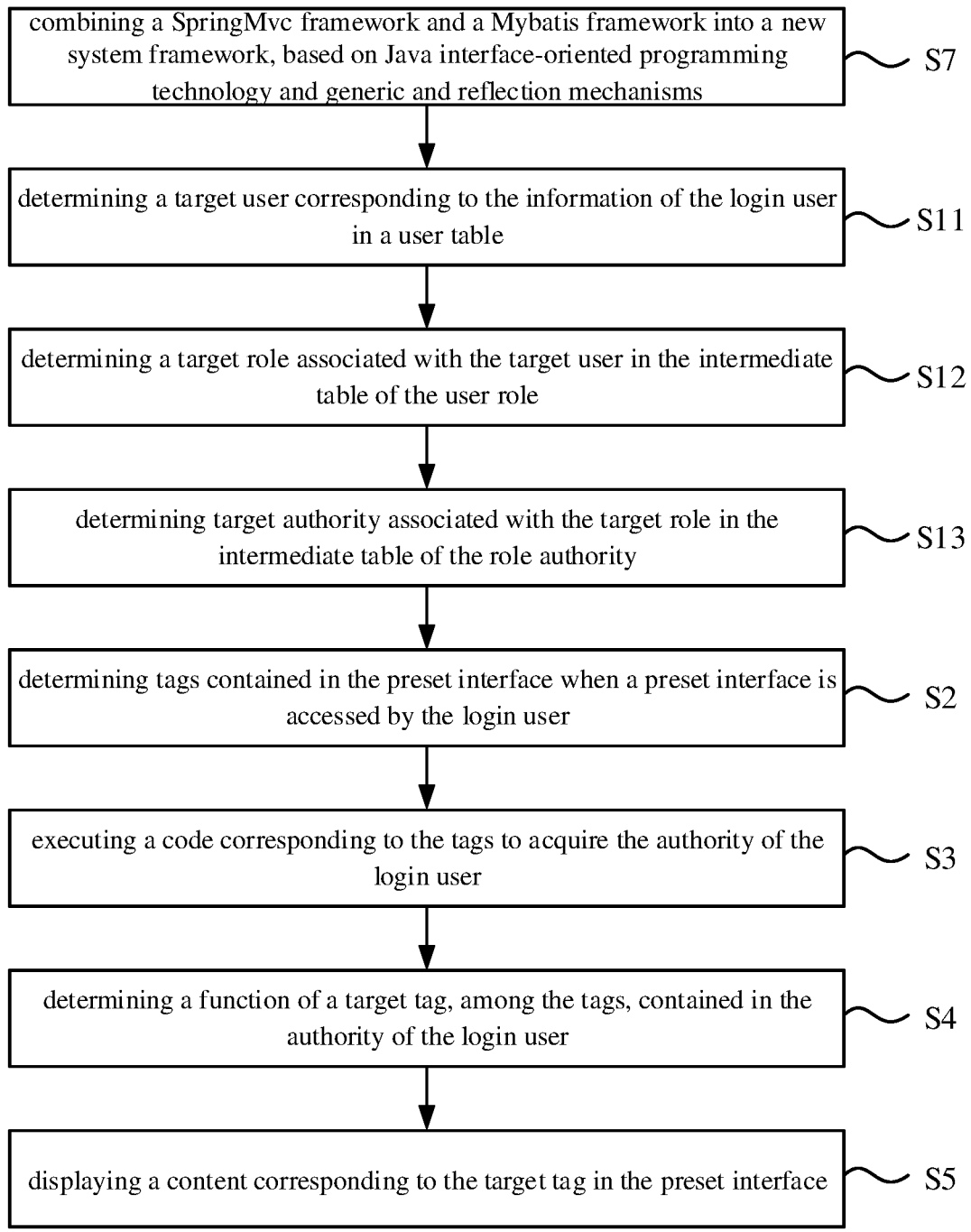
FIG. 5 is a schematic flow chart of further another authority filter method according to an embodiment of the present disclosure.

FIG. 5 is a schematic flow chart of further another authority filter method according to an embodiment of the present disclosure. As illustrated in FIG. 5, determining the authority of the login user according to the information of the login user includes:

step S11, determining a target user corresponding to the information of the login user in the user table;

step S12, determining a target role associated with the target user in the intermediate table of the user role;

step S13, determining target authority associated with the target role in the intermediate table of the role authority.

In one embodiment, the information of the login user may include the username, password and other information of the login user; the target user corresponding to the username of the login user can be determined in the user table, and further the target role associated with the target user can be determined in the intermediate table of the user role, in which the target user can also exist in the form of username and be associated with the target role, and then the target authority associated with the target role can be determined in the intermediate table of the role authority. After the target authority is determined, the identifier of the authority and the link of the authority can be determined.

Corresponding to the above embodiment of the authority filter method, the present disclosure further provides at least one embodiment of the authority filter device.

Figure 6:
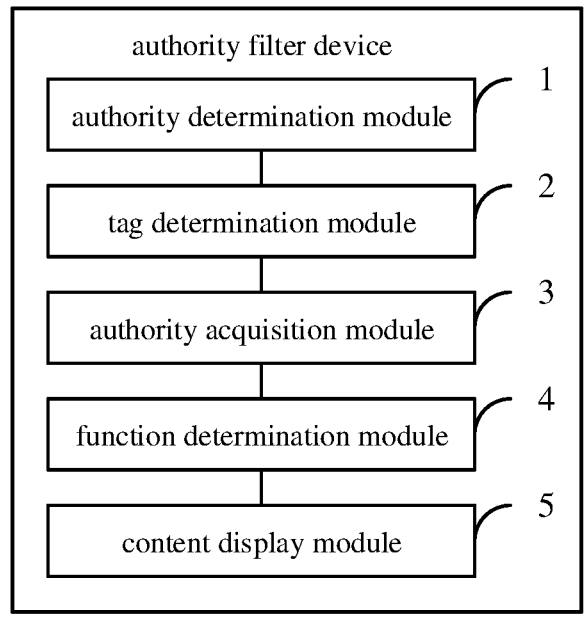
FIG. 6 is a schematic block diagram of an authority filter device according to an embodiment of the present disclosure.

FIG. 6 is a schematic block diagram of an authority filter device according to an embodiment of the present disclosure. The authority filter device in the embodiment of the present disclosure can be applied to terminals, such as mobile phones, tablet computers, wearable devices, etc., and can also be applied to servers. Hereinafter, the embodiment of the present disclosure is explained by taking the case where the authority filter device is used in a server as an example.

As illustrated in FIG. 6, for example, the authority filter device includes:

an authority determination module 1 configured to determine an authority of a login user according to information of the login user;

a tag determination module 2 configured to determine tags contained in a preset interface when the preset interface is accessed by the login user;

an authority acquisition module 3 configured to execute a code corresponding to the tags to acquire the authority of the login user;

a function determination module 4 configured to determine a function of a target tag, among the tags, contained in the authority of the login user; and a content display module 5 configured to display a content corresponding to the target tag in the preset interface.

Figure 7:
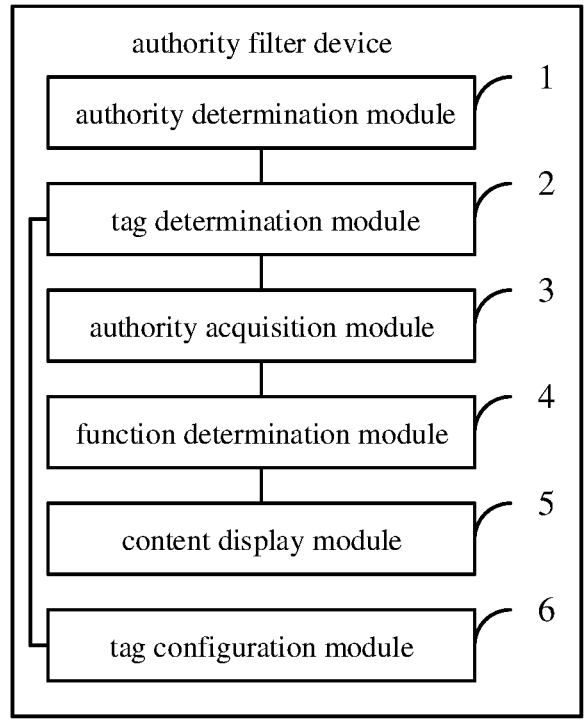
FIG. 7 is a schematic block diagram of another authority filter device according to an embodiment of the present disclosure.

FIG. 7 is a schematic block diagram of another authority filter device according to an embodiment of the present disclosure. As illustrated in FIG. 7, the device further includes:

a tag configuration module 6 configured to configure a custom tag library.

The tag determination module 2 is configured to determine a tag belonging to the custom tag library among the tags contained in the preset interface.

Optionally, the content corresponding to the target tag is displayed through a tree diagram, and the content display module is used to display a corresponding branch of the content corresponding to the target tag in the tree diagram in a preset interface.

Figure 8:
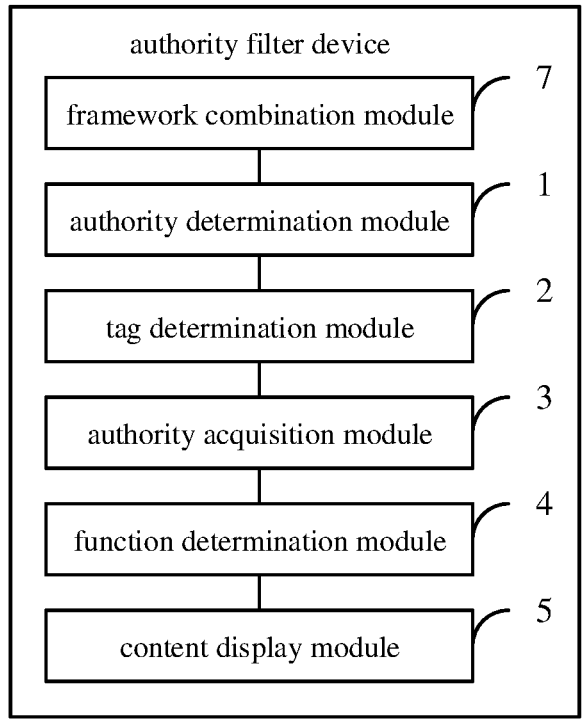
FIG. 8 is a schematic block diagram of further another authority filter device according to an embodiment of the present disclosure.

FIG. 8 is a schematic block diagram of another authority filter device according to an embodiment of the present disclosure. As illustrated in FIG. 8, the device further includes:

a framework combination module 7 configured to combine a SpringMvc framework and a Mybatis framework into a new system framework based on Java interface-oriented programming technology and generic and reflection mechanisms.

The new system framework includes a user table, a role table, an authority table, an intermediate table of a user role and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

Figure 9:
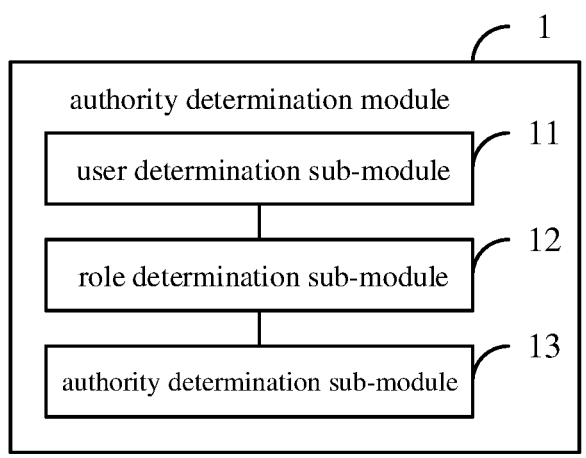
FIG. 9 is a schematic block diagram of an authority determination module according to an embodiment of the present disclosure.

FIG. 9 is a schematic block diagram of an authority determination module according to an embodiment of the present disclosure. As illustrated in FIG. 9, the authority determination module 1 includes:

a user determination sub-module 11 configured to determine a target user corresponding to the information of the login user in the user table;

a role determination sub-module 12 configured to determine a target role associated with the target user in the intermediate table of the user role; and an authority determination sub-module 13 configured to determine target authority associated with the target role in the intermediate table of the role authority.

With regard to the devices in the above embodiments, the specific manner in which each module performs the operations has been described in detail in the embodiments related to the method, and is not described in detail here.

As for embodiments of the device, because they basically correspond to the method embodiments, and can be referred to the description of the method embodiments for relevant content. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the disclosed scheme. Those of ordinary skill in this art can understand and implement it without creative labor.

At least one embodiment of the disclosure further provides an electronic device, and the electronic device includes a processor, and a memory configured to store instructions that are capable of being executed by the processor; and the processor is configured to execute the steps in the method according to any one of the above embodiments.

At least an embodiment of the present disclosure further provides a computer readable storage medium, a computer program is stored in the computer readable storage medium, and when the program is executed by a processor, the steps in the method described in any one of the above embodiments are realized.

In the present disclosure, the terms "first" and "second" are only configured to descriptive purposes, and cannot be understood as indicating or implying relative importance. The term "plural" means two or more, unless otherwise explicitly defined.

Other embodiments of the present disclosure will readily occur to those skilled in the art after considering the specification and practicing the disclosure disclosed herein. The present disclosure is intended to cover any modification, use or adaptation of the present disclosure, which follows the general principle of the present disclosure and includes the common knowledge or conventional technical means in the technical field which is not disclosed by the present disclosure. The specification and examples are to be regarded as exemplary only, and the scope of protection of the present disclosure is defined by the following claims.

It should be understood that the present disclosure is not limited to the precise structure described above and illustrated in the drawings, and various modifications and changes can be made without departing from its scope. The scope of the disclosure is limited only by the appended claims.

What is claimed is:

1. An authority filter method, comprising:
   determining an authority of a login user according to information of the login user;
   determining tags contained in a preset interface when the preset interface is accessed by the login user;
   executing a code corresponding to the tags to acquire the authority of the login user;
   determining a function of a target tag, among the tags, contained in the authority of the login user; and
   displaying a content corresponding to the target tag in the preset interface,
   wherein before determining the authority of the login user according to information of a user table of the login user, the method further comprises:
   combining a SpringMvc framework and a Mybatis framework into a new system framework, based on Java interface-oriented programming technology and generic and reflection mechanisms,
   wherein the new system framework comprises the user table, a role table, an authority table, an intermediate table of a user role, and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

2. The authority filter method according to claim 1, wherein before determining the tags contained in the preset interface, the method further comprises:
   configuring a custom tag library,
   wherein determining the tags contained in the preset interface comprises:
   determining a tag belonging to the custom tag library among the tags contained in the preset interface.

3. The authority filter method according to claim 1, wherein the content corresponding to the target tag is displayed through a tree diagram, and displaying the content corresponding to the target tag in the preset interface comprises:
   displaying a corresponding branch of the content corresponding to the target tag in the tree diagram in the preset interface.

4. The authority filter method according to claim 1, wherein determining the authority of the login user according to the information of the login user comprises:
   determining a target user corresponding to the information of the login user in the user table;
   determining a target role associated with the target user in the intermediate table of the user role; and
   determining target authority associated with the target role in the intermediate table of the role authority.

5. An authority filter device, comprising:
   an authority determination module, configured to determine an authority of a login user according to information of the login user;
   a tag determination module, configured to determine tags contained in a preset interface when the preset interface is accessed by the login user;
   an authority acquisition module, configured to execute a code corresponding to the tags to acquire the authority of the login user;
   a function determination module, configured to determine a function of a target tag, among the tags, contained in the authority of the login user;
   a content display module, configured to display a content corresponding to the target tag in the preset interface; and
   a framework combination module configured to combine a SpringMvc framework and a Mybatis framework into a new system framework based on Java interface-oriented programming technology and generic and reflection mechanisms,
   wherein the new system framework comprises a user table, a role table, an authority table, an intermediate table of a user role, and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

6. The authority filter device according to claim 5, further comprising:
   a tag configuration module, configured to configure a custom tag library,
   wherein the tag determination module is configured to determine a tag belonging to the custom tag library among the tags contained in the preset interface.

7. The authority filter device according to claim 5, wherein the content corresponding to the target tag is displayed through a tree diagram, and the content display module is configured to display a corresponding branch of the content corresponding to the target tag in the tree diagram in the preset interface.

8. The authority filter device according to claim 5, wherein the authority determination module comprises:
   a user determination sub-module configured to determine a target user corresponding to the information of the login user in the user table;
   a role determination sub-module configured to determine a target role associated with the target user in the intermediate table of the user role; and
   an authority determination sub-module configured to determine target authority associated with the target role in the intermediate table of the role authority.

9. An electronic device, comprising:
a processor; and
a memory, configured to store instructions that are capable of being executed by the processor,
wherein the processor is configured to execute an authority filter method, comprising:
   determining an authority of a login user according to information of the login user;
   determining tags contained in a preset interface when the preset interface is accessed by the login user;
   executing a code corresponding to the tags to acquire the authority of the login user;
   determining a function of a target tag, among the tags, contained in the authority of the login user; and
   displaying a content corresponding to the target tag in the preset interface,
wherein before determining the authority of the login user according to information of a user table of the login user, the method further comprises:
combining a SpringMvc framework and a Mybatis framework into a new system framework, based on Java interface-oriented programming technology and generic and reflection mechanisms,
wherein the new system framework comprises the user table, a role table, an authority table, an intermediate table of a user role, and an intermediate table of a role authority, the user table is used to record a name of a user and information of the user, the role table is used to record a role and validity of the role, the authority table is used to record identification of authority, a link of the authority, and validity of the authority, the intermediate table of the user role is used to record a correlation between the user and the role, and the intermediate table of the role authority is used to record a correlation between the role and the authority.

* * * * *